(12) United States Patent
Kunitake et al.

(10) Patent No.: US 6,677,043 B2
(45) Date of Patent: Jan. 13, 2004

(54) NANO-WRAPPED MOLECULAR MATERIALS

(75) Inventors: Toyoki Kunitake, Tokyo (JP); Izumi Ichinose, Tokyo (JP)

(73) Assignee: Riken, Wako (JP)

( * ) Notice: Subject to any disclaimer, the term of this patent is extended or adjusted under 35 U.S.C. 154(b) by 0 days.

(21) Appl. No.: 10/096,275

(22) Filed: Mar. 13, 2002

(65) Prior Publication Data

US 2002/0182413 A1 Dec. 5, 2002

(30) Foreign Application Priority Data

Mar. 13, 2001 (JP) .......................................... 2001-070874
Dec. 25, 2001 (JP) .......................................... 2001-392087

(51) Int. Cl.$^7$ ................................................. B32B 5/66

(52) U.S. Cl. .................... 428/403; 428/405; 428/407

(58) Field of Search ................................. 428/403, 405, 428/407

(56) References Cited

U.S. PATENT DOCUMENTS 6,368,406 B1 * 4/2002 Deevi et al. ................ 117/108

OTHER PUBLICATIONS

Izumo Ichinose et al "Wrapping Individual Chains". Advanced Materials, vol. 14, No. 5, 344–346, Mar. 2002.*

Izumi Ichinose et al., "Wrapping Individual Chains of a Viologen Polymer with an Ultrathin Silicate Sheath", Advanced Materials, vol. 14, No. 5, Mar. 4, 2002, pp. 344–346.

Sumit Mazumdar, "Prospects for the Polymer Nanoengineer", Science, vol. 288, Apr. 28, 2000, pp. 630–631.

Thuc–Quyen Nguyen et al., "Control of Energy Transfer in Oriented Conjugated Polymer–Mesoporous Silica Composites", Science, vol. 288, Apr. 28, 2000, pp. 652–656.

D.–M. Liu et al., "Encapsulation of Protein Molecules in Transparent Porous Silica Matrices Via An Aqueous Colloidal Sol–Gel Process", Acta Mater, vol. 47, No. 18, 1999, pp. 4535–4544.

* cited by examiner

*Primary Examiner*—Leszek Kiliman
(74) *Attorney, Agent, or Firm*—Birch, Stewart, Kolasch & Birch, LLP

(57) ABSTRACT

Nano-wrapped molecular materials comprising molecule, molecular aggregate, or nanoparticle which has the surface at least partially covered with an ultrathin film containing oxygen-metal bond was disclosed. The nano-wrapped molecular materials successfully retain or are dramatically improved in the intrinsic physical and chemical properties of the individual molecules or nanoparticles.

14 Claims, 12 Drawing Sheets

NANO-WRAPPED MOLECULAR MATERIALS

TECHNICAL FIELD

The present invention provides molecular materials which successfully retain or have dramatically improved intrinsic physical and chemical properties of the individual molecules, such as solubility, miscibility, stiffness, adsorption property, visco-elastic property, electron mobility, fluorescent property, reactivity, aggregation property and conformation property, which can be obtained by wrapping molecules or nanoparticles with ultrathin film. The present invention also provides molecular materials which can serve as elements for constructing nano-sized organized structures in which the molecular materials can fully function just as an isolated molecule.

RELATED ART

Molecules or molecular aggregates can exhibit their specific properties depending on the structure and composition. Molecular properties are directly expressed in a dilute solution or gaseous state. Coating or forming films of highly dispersed (solubilized) molecules on the surface of a substrate in order to utilize such molecules as functional materials, however, often results in ruining of the intrinsic properties shown by the individual molecules. This is caused by changes in the molecular properties due to intermolecular interaction or restriction in molecular conformation due to crystallization.

To overcome the problem, there has been proposed various techniques for coating or isolating the individual molecules with proper methods. The methods include: a) spatially immobilizing molecules on the surface of solid substrates or particles, or within three-dimensional gels in order to prohibit interactions or reactions between the molecules; b) isolating molecules as guests in porous materials, layered materials, host molecules having certain internal cavities, or organized molecular assemblies; c) dispersing molecules within organic or inorganic polymers; d) enclosing molecules within molecular aggregates such as micelles; and e) including molecules within nano-structured molecules such as dendrimers.

In case that molecules are to be immobilized on the surface of a support such as solid substrates, it is necessary for the molecules to have a functional group which strongly interacts with such surface. In order to exhibit properties of the individual molecules on the surface of the support, it is also necessary to select a condition which can successfully prevent the immobilized molecules from being associated on the surface. Species of the support appropriate to the purpose and available molecules are however limited. The same will apply to the case that particles are used as the support.

The spatial immobilization of molecules within the three-dimensional gel is suitable for giant molecules but is hardly applicable to small molecules. The shape of voids and properties of porous materials are macroscopically determined by their crystal structures and cannot accommodate a wide variety of molecules. Even barrel-shaped molecules such as cyclodextrin have a strong structural specificity and can only accept a limited range of guest molecules. Water-soluble micelles can incorporate a variety of hydrophobic molecules, but its nature as a fluid molecular aggregate prevents the molecule isolated within such micelles to be used for a wide range of applications.

Certain cases have been reported where functional molecules (units) confined in the dendrimer are advantageously stabilized and would otherwise be unstable in open spaces, such as in the chemical reaction wherein low energy light is concentrated and converted it into high energy light. For such cases, it has been reported that the efficient energy transfer is ensured by the fact that the central functional molecule is isolated from the external space by the dendrimer structure, and that such dendrimer structure has an excellent rigidity. The dendrimer structure, however, needs a lot of steps for synthesis and can be obtained only in a poor yield. The challenges faced in developing desirable molecular wrapping through organic synthesis are considerable and require a great deal of work to obtain new molecular designs, synthesis, structural confirmation, and the succeeding new molecular design.

It is supposed that techniques for producing nano-precision ultrathin films is necessary for precisely covering molecule-sized materials. Such ultrathin films for covering will necessarily be conformable to every kind of molecular shape. There have been widely-known techniques for protecting active hydroxyl groups on solids or particles by reacting them with silane couplers, none of which could completely cover the molecular surface with the protective groups, so that the molecule could not completely be isolated from the external environment.

As has been described in the above, isolating the individual molecules is indispensable for fully expressing their intrinsic molecular functions. It is therefore an object of the present invention to provide molecular materials successfully retaining or being dramatically improved in the intrinsic physical and chemical properties of the individual molecules It is another object of the present invention to facilitate, through provision of such molecular materials, spatial design of molecular function, retention or improvement of properties intrinsically owned by the isolated molecule, thorough expression of the functions attributable to the molecular structure, construction of functional materials on solid substrates, and manipulation of molecules.

SUMMARY OF THE INVENTION

The present inventors found out after extensive investigations that the foregoing objects can be accomplished by using nano-wrapped molecular materials comprising molecule, molecular aggregate or nanoparticle which has the surface at least partially covered with an ultrathin film containing oxygen-metal bond. The present invention is to provide also nano-wrapped molecular materials comprising a plurality of molecules, molecular aggregates and/or nano-particles covered with a single continuous ultrathin film containing oxygen-metal bond. The materials also include such that comprising a plurality of molecules, molecular aggregates and/or nano-particles which are thoroughly dispersed inside of a single ultrathin film containing oxygen-metal bond.

In the nano-wrapped molecular materials of the present invention, the molecule, molecular aggregate, or nanoparticle is preferably bound with the ultrathin film through chemical bond, physical bond, or electrostatic bond. The molecule, molecular aggregate, or nanoparticle may be wrapped with two or more layers of such ultrathin film, where the total thickness of such wrapping film is preferably 0.5 to 100 nm.

It is preferable that the molecule, molecular aggregate, or nanoparticle is physically isolated from solvent molecule in a partial or extensive manner, and has solubility. In particular, it is preferable that the molecule, molecular aggregate, or nanoparticle is covered with the ultrathin film to an extent which does not cause substantial changes in the properties of such molecule, molecular aggregate, or nanoparticle due to interaction between the molecules or nanoparticles. The nano-wrapped molecular materials of the present invention may also have reactive outer surfaces.

The nano-wrapped molecular materials of the present invention are preferably such that being covered through hydrolysis and condensation reaction of metal alkoxide compounds. Examples of the nano-wrapped molecular materials include such that having the ultrathin film formed by binding metal alkoxide compound to at least a part of active groups, which exist on the surface of the molecule, molecular aggregate or nanoparticle, that has reactivity with such metal alkoxide compound, and then by hydrolyzing the product to thereby condense the metal alkoxide compound; such that having the ultrathin film formed by binding metal alkoxide condensate that formed by condensing a plurality of metal alkoxide molecules to at least a part of active groups, which exist on the surface of the moleculer molecular aggregate, or nanoparticle that has reactivity with such metal alkoxide compound; such that having the ultrathin film formed by allowing at least apart of cationic charges, which exist on the surface of the molecule, molecular aggregate, or nanoparticle, to interact in an electrostatic manner with a condensate of silanol-group-containing compound; and such that having the ultrathin film formed by allowing at least a part of hydrogen-bond-formable groups, which exist on the surface of the molecule, molecular aggregate, or nanoparticle, to interact through hydrogen bonding with a condensate of silanol-group-containing compound

BRIEF DESCRIPTION OF THE DRAWINGS

The above and other objects and features of the invention are apparent to those skilled in the art from the following preferred embodiments thereof when considered in conjunction with the accompanied drawings, in which.

DETAILED DESCRIPTION OF THE INVENTION

Figure 1:
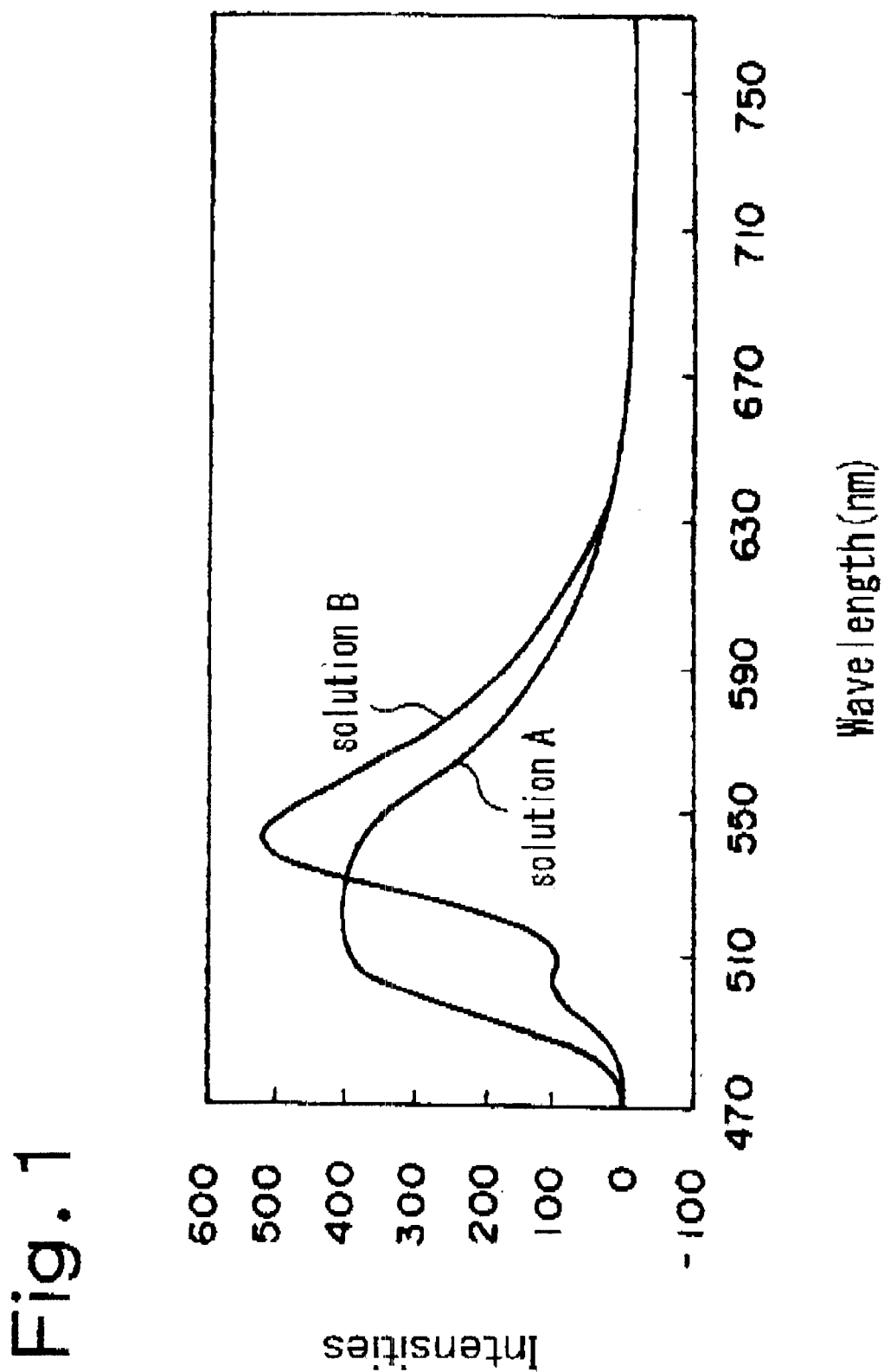
FIG. 1 shows fluorescent spectral changes observed in the process of complex formation between fluorescein and titanium isopropoxide in Example 1.

The nano-wrapped molecular materials of the present invention will be detailed below. It should now be noted that, in this specification, any notation for numerical range using a word "to" indicates a range defined by values placed before and after "to", where both ends are inclusive as minimum and maximum values.

There is no specific limitation on the molecular species to be covered with the ultrathin film, and generally available examples thereof include organic molecules, inorganic molecules, polymers, biological molecules, biological polymers, dye molecules, clusters and supermolecules. It is also allowable to use molecular aggregates formed by a plurality of molecules assembled with keeping a specific aggregation style. The molecules and molecular aggregates available in the present invention are by no means limited in terms of the size thereof, nor in terms of the existing states of gas, liquid or solid.

There is also no specific limitation on the species of the nanoparticles to be covered with the ultrathin film and generally available examples thereof include those comprising metals, metal oxides, inorganic materials, organic materials, or mixtures thereof, all of which may have arbitrary shapes. It is to be noted, however, that the particle size is preferably 1 nm to 1 $\mu$m, more preferably 1 to 100 nm, and still more preferably 10 to 50 nm.

In the present invention, the ultrathin film covering the molecule, molecular aggregate, or nanoparticle is composed of materials having oxygen-metal bond. Preferable are metal-alkoxide compounds, specific examples of which will be described later. The ultrathin film in the context of this specification is that generally having a thickness within a range from 0.5 to 100 nm, more preferably 0.5 to 10 nm, and still more preferably 1 to 5 nm The nano-wrapped molecular materials of the present invention is characterized in that at least a part of the surface of the molecule, molecular aggregate or nanoparticle composing such materials is covered with the ultrathin film, which allows proper adjustment of the solubility of the molecule or miscibility with other materials. The nano-wrapped molecular materials comprising polymer materials covered with the ultrathin film can dramatically improve the properties thereof such as visco-elastic property of the polymer. On the other hand, molecule covered with the ultrathin film can fully express the properties intrinsically owned by the isolated molecule, where the properties are typified by fluorescent property and electron mobility. It is known that functions of molecules or biological molecules are often susceptible to a degree of freedom of the conformation or association property. The nano-wrapped molecular materials are also much beneficial for the purpose of adjusting such properties. Such coverage can also suppress the reactivity of molecules, or can regulate adsorption property of the nano-wrapped molecular materials or reactivity thereof with other materials. By using the nano-wrapped molecular materials, it also becomes possible to construct nano-sized organized structures capable of fully expressing functions intrinsically owned by the isolated molecule. Other molecular properties possibly be improved in such nano-wrapped molecular materials include light absorbing property in the ultraviolet, visible light, near-infrared, infrared and far-infrared ranges, magnetic property, polarization property, refractive index and electric conductivity.

With the nano-wrapped molecular materials of the present invention characterized in that at least a part of the surface of a plurality of molecules, molecular aggregates or nanoparticles composing such materials is covered with the ultrathin film, it becomes possible to construct materials that can directly express and integrate functions owned by such plurality of molecules, molecular aggregates, or nanoparticles. Referring now for example to photosynthesis of plants, a plurality of antenna molecules harvest light energy, and concentrate such energy into dye molecules which form a reaction center, to thereby ensure a highly efficient energy conversion. So that it can be expected that entire wrapping of a plurality of biological molecules (proteins) responsible for the photosynthesis herein will make it possible to successfully apply such highly-efficient photochemical reaction to an artificial system. It is also allowable to wrap a variety of molecular aggregates formed by self-assemblying molecules, and to use the products as the nano-wrapped molecular materials.

It is preferable that the nano-wrapped molecular materials of the present invention are physically isolated from solvent molecules in a partial or extensive manner, and have solubility. The thickness of the wrapping film is preferably 0.5 to 100 nm in general, more preferably 0.5 to 10 nm, and still more preferably 1 to 5 nm The present invention also includes those having two or more layers of the wrapping film, that is the nano-wrapped molecular materials may further be wrapped with another ultrathin film. Those having reactive outer surface are also allowable, where such reactive outer surface is typified by the surface of the nano-wrapped molecular materials having metal alkoxide groups.

While methods for producing such nano-wrapped molecular materials are not specifically limited, preferable methods A and B can be exemplified as follows.

A method for producing the nano-wrapped molecular materials with the aid of the active hydroxyl groups (method A) employs molecule having active hydroxyl groups as the molecule to be wrapped. Metal alkoxide compounds or partially hydrolyzed products thereof can be crosslinked with each other via an oxygen atom to thereby form oligomers in an organic solvent. When such oligomers are brought into contact with compounds having a plurality of hydroxyl groups or carboxyl groups, the oligomers react with the active hydroxyl groups of the compounds to thereby produce such compounds covered with the oligomers of the metal alkoxide compounds.

As the metal alkoxide compounds available in such method, any known compounds having metal alkoxide groups are available without special limitation, and typical examples thereof include titanium butoxide ($Ti(O^nBu)_4$), zirconium propoxide ($Zr(O^nPr)_4$), aluminum butoxide ($Al(O^nBu)_4$), niobium butoxide ($Ni(O^nBu)_5$), tetramethoxysilane ($Si(OMe)_4$) and methyltrimethoxysilane ($MeSi(OMe)_3$).

While there is no special limitation on making contact between the compounds having active hydroxyl groups and the metal alkoxide compounds, such contact can generally be accomplished in a pure or mixed organic solvent such as methanol, ethanol, toluene, propanols, and benzene.

The concentration of the molecules having active hydroxyl groups in the foregoing solution is preferably 0.01 to 10 mM or around, and the concentration of the metal alkoxide compounds is preferably 1 to 100 mM or around. The duration of the contact and the temperature depend on activity of the metal alkoxide compounds to be employed and cannot simply be specified, but can generally be determined within a range from 1 minute to several hours, and from 0 to 100° C. Significant reduction in the process time can also be expected by using catalyst such as acid or base in the chemical reaction.

While the degree of the coverage on the molecule having active hydroxyl groups is dependent on the number of active hydroxyl groups, their spatial conformation and reaction rate, it is attainable only to an incomplete degree in general. Of course, such product with the incomplete coverage can also be used as the nano-wrapped molecular materials depending on the purpose of use thereof so far as a desirable level of independence of the individual molecules is ensured.

In order to attain a highly covered structure, it is advantageous to add water or chemicals capable to initiate the condensation reaction between metal alkoxide compounds, after the molecule having active hydroxyl group and metal alkoxide compound are brought into contact. The amount of addition of water is not specifically limited if provided in a range not exceeding 4 times against the metal alkoxides. Degree of the coverage will successfully be regulated by controlling the amount of addition of metal alkoxide compounds and water within the foregoing range against the amount of the molecule having active hydroxyl groups. Substances responsible for initiation of the condensation reaction of the metal alkoxide compounds are preferably organic compounds having a plurality of active groups within the molecules, where examples of which include ethylene glycol, pentaerythritol, monosaccharide, polyvinyl alcohol, glycerin, oxalic acid and glutamic acid.

It is also allowable to activate alkoxide groups on the surface of the partially covered molecule by hydrolysis, and to allow the product to further react with the metal alkoxide compounds, to thereby increase the degree of the coverage. On the contrary, if the alkoxide groups on the surface of the nano-wrapped molecular materials are remained intact without being hydrolyzed, such nano-wrapped molecular materials can be adsorbed onto other molecules or to the substrate surfaces having active hydroxyl groups, to thereby form a bulk or thin film materials of nano-sized hybrid in which the components are highly dispersed at a molecular level.

As mentioned in the above, the nano-wrapped molecular materials have a lot of alkoxide groups on the surface thereof. Coverage of such materials with a second organometallic compounds can reinforce such covered structures of the nano-wrapped molecular materials or alter the properties thereof. Organosilane compounds as such second covering materials allow a variety of surface designs of the nano-wrapped molecular materials, while being not specifically limited thereto.

There is no special limitation on the organosilane compounds. Representative examples thereof include organosilane compounds having alkyl and alkoxide groups in one molecule such as hexyltrimethoxysilane, octyltrimethoxysilane, cyclopentyltrimethoxysilane and cyclohexyltrimethoxysilane; organosilane compounds having vinyl and alkoxide groups in one molecule such as vinyltrimethoxysilane; organosilane compounds having amino and alkoxide groups in one molecule such as (N,N-dimethylaminopropyl)trimethoxysilane, (N,N-diethylaminopropyl)trimethoxysilane, aminopropyltrimethoxysilane, N-(6-aminohexyl) aminopropyltrimethoxysilane, and (aminoethylaminomethyl)phenethyltrimethoxysilane; compounds having ammonium and alkoxide groups in one molecule such as N,N,N-trimethylammoniopropyltrimethoxysilane; organosilane compounds having heteroaromatic ring and alkoxide groups in one molecule such as 2-(trimethoxysilylethyl)pyridine; organosilane compounds having fluoroalkyl and alkoxide groups in one molecule such as (3,3,3-trifluoropropyl) trimethoxysilane and (decafluoro-1,1,2,2-tetrahydrooctyl) triethoxysilane; organosilane compounds having polyethyleneglycol and alkoxide groups in one molecule such as N-(triethoxysilylpropyl)-O-polyethyleneoxide-urethane; organosilane compounds having thiocyanate and alkoxide groups in one molecule such as 3-thiocyanatepropyltriethoxysilane; organosilane compounds having ether and alkoxide groups in one molecule such as 3-methoxypropyltrimethoxysilane; organosilane compounds having thiol and alkoxide groups in one molecule such as 3-mercaptopropyltrimethoxysilane; organosilane compounds having halogen atom and alkoxide groups in one molecule such as 3-iodopropyltrimethoxysilane and 3-bromo-propyltrimethoxysilane; organosilane compounds having epoxy and alkoxide groups in one molecule such as 5,5-epoxyhexyl-triethoxysilane; organosilane compounds having sulfide and alkoxide groups in one molecule such as bis[3-(triethoxysilyl)-propyl]tetrasulfide; organosilane compounds having hydroxyl, amino and alkoxide groups such as bis(2-hydroxyethyl)-3-amino-propyltriethoxysilane; organosilane compounds having an amino group and groups derived by hydrolysis of alkoxide groups in one molecule such as aminopropylsilane triol; organosilane compounds having alkyl group and chlorine atoms in one molecule such as octyltrichlorosilane, cyclotetramethylenedi-chlorosilane, (cyclohexylmethyl))trichlorosilane, cyclohexyl-trichlorosilane, and tert-butyltrichlorosilane; organosilane compounds having fluoroalkyl group and chlorine atoms in one molecule such as (decafluoro-1,1,2,2-tetrahydrooctyl) tri-chlorosilane and (3,3,3-trifluoropropyl)trichlorosilane; organosilane compounds having heteroaromatic ring and chlorine atoms in one molecule such as 2-[2-(trichlorosilyl)-ethyl]pyridine; and organosilane compounds having an aromatic ring and chlorine atoms in one molecule such as phenethyltrichlorosilane. These compounds can also be used in arbitrary combination of two or more thereof.

So far as the organosilane compounds are used as the second covering compounds, conditions for contacting the nano-wrapped molecular materials with such second covering compounds are by no means specifically limited, where a preferable method relates to mixing of the both in an organic solvent. The concentration of the second covering compounds can arbitrarily be determined so far as the surface of the nano-wrapped molecular materials to be covered is desirably coated, where a preferable range is 1 to 100 mM or around. The duration of the contact and the temperature cannot simply be specified since they are susceptible to the activity of the metal alkoxide compounds employed, but can generally be determined within a range from 1 minute to several hours, and from 0 to 100° C. Significant reduction in the process time can also be expected by using catalyst such as acid or base in the chemical reaction.

The use of organosilane compounds having an alkyl group, as the second covering compound, will yield nano-wrapped molecular materials having an inactive surface, and the use of organosilane compounds having amino groups will yield hydrophilic nano-wrapped molecular materials.

A method for producing the nano-wrapped molecular materials based on interaction with the ultrathin film having oxygen-metal bond (method B) employs molecule having cationic charge or hydrogen-bond-formable group as the molecule to be covered. Hydrolysis of metal alkoxide compounds generates hydroxyl groups and allows such compounds to condense with each other through oxygen-metal bonding, to thereby form a metal oxide gel. The hydroxyl groups generated by the hydrolysis will dissociate under an appropriate pH condition to have anionic charges. The hydroxyl groups generated by the hydrolysis can also form strong hydrogen bonding with organic molecules. So that the metal oxide gel can interact with a molecule having cationic charge in an electrostatic manner, and thus can interact with a molecule having a hydrogen-bond-formable groups through hydrogen bonding. Because of such natures, contacting the molecule having a hydrogen-bond-formable group with the metal oxide compounds under an appropriate condition will give a structure in which the surface of such molecule is covered with a thin film of the metal oxide gel. While the "hydrogen-bond-formable group" in the context herein is by no means specifically limited, typical examples thereof include hydroxyl group, amino group, thiol group, carboxyl group and pyridyl group.

Representative compounds available as the metal alkoxide compounds in the method B include metal alkoxide compounds such as tetramethoxysilane ($Si(OMe)_4$), methyltrimethoxysilane ($MeSi(OMe)_3$); metal alkoxide compounds having an amino group such as (N,N-dimethylaminopropyl)trimethoxysilane, (N,N-diethylaminopropyl)trimethoxysilane, aminopropyltrimethoxysilane, N-(6-aminohexyl) aminopropyltrimethoxysilane and, (aminoethylaminomethyl)phenethyltrimethoxysilane; metal alkoxide compounds having an ammonium group such as N,N,N-tri-methylammoniopropyltrimethoxysilane; metal alkoxide compounds having a heteroaromatic ring such as 2-(trimethoxysilylethyl)pyridine; metal alkoxide compounds having a polyethyleneglycol group such as N-(triethoxypropyl)-O-polyethylene oxide urethane; and metal alkoxide compounds having hydroxyl group and amino group such as bis(2-hydroxyethyl)-3-aminopropyltriethoxysilane. Other available materials, although being not classified as metal alkoxide, include metal compounds having amino and hydroxyl groups such as aminopropylsilane triol, inorganic salt such as sodium metasilicate and its aqueous solution, and silane tetraol obtained in organic solvent and their oligomeric condensates. It is also allowable to use two or more of these materials in arbitrary combinations. For the coating with aqueous solution containing inorganic salt such as sodium metasilicate, addition of multi-valent cation such as barium ion or lanthanoid ions is advantageous in promoting formation of the metal oxide gel layer.

While there is no special limitation on the contact procedures of the molecule having cationic groups with the metal alkoxide compounds, the contact can generally be conducted in a polar solvent such as methanol, ethanol, propanol, or water, all of which are available as pare or mixed solvent. The contact of the molecule having hydrogen-bond-formable groups with the metal alkoxide compounds can be conducted in a nonpolar solvent such as tetrahydrofuran or toluene, all of which are available as pare or mixed solvent.

The concentration of the molecule having cationic charges or hydrogen-bond-formable groups in such solvent is preferably 0.01 to 10 mM or around, and the concentration of the metal alkoxide compound is preferably 1 to 100 mM or around. The duration of contact and the temperature depend on activity of the metal alkoxide compounds to be employed and cannot simply be specified, but can generally be determined within a range from 1 minute to several hours, and from 0 to 100° C. Significant reduction in the process time can also be expected by using catalyst such as acid or base in the chemical reaction.

A degree of coverage on the molecule in the methods A and B depends on the number, spatial conformation and reaction rate of the active hydroxyl groups and cationic charges owned by the target molecule, but is generally incomplete. Of course, depending on the purpose of use, the materials with an incomplete level of coverage is also available as the nano-wrapped molecular materials so far as the independence of the individual molecules are ensured at a desirable level.

The nano-wrapped molecular materials per se are largely expected for their versatility. First of all, the nano-wrapped molecular materials can control their surface chemical properties, which allows to optimize the solubility, miscibility, reactivity and adsorptivity. It becomes also possible to control even fluorescent property, electron mobility, conformation property, visco-elasticity, aggregation property, and self-assembly property intrinsically owned by the molecular materials. It becomes also possible to control magnetic property, polarization property, refractive index and electron conductivity, which depends on aggregation structure of such molecules. It becomes still also possible to control light absorption property in the ultraviolet, visible light, near-infrared, infrared, and far-infrared ranges which are intrinsic to the isolated molecule. A molecule enclosed in the shell is isolated from the external environment, and can exhibit interesting features in chemical reaction, where materials synthesis based on redox reduction, memorization of molecular conformation, and photochromic property can arbitrarily be controlled.

Next paragraphs will specifically describe a part of such examples.

Fluorescent dyes often lose its fluorescent properties due to the association, which accelerates self-quenching So that it is not recommendable to use such dyes in a form of concentrated solution or solid. On the contrary, direct electronic interaction among the dye molecules are desirably suppressed in the nano-wrapped molecular materials so as to allow the individual molecular properties to be expressed even in the solid state. In other known cases for some cyanine dyes, the fluorescent property is conversely enhanced in J-aggregation. Covering of the dye aggregates with an ultrathin film in this case is also advantageous in that providing the materials, keeping the aggregation structure. As for the nano-wrapped molecular materials, proper design of the thickness of the covering film and/or spatial configuration will properly adjust the inter-molecular interaction in electrical, optical, or magnetic sense, which will result in unique functions. For example, azobenzene group causes cis-trans isomerization stimulated by light or heat, where the isomerization characteristics can significantly vary depending on the orientation. More specifically, efficiency of the isomerization will be degraded when azobenzene groups are assembled in the H-type orientation under high concentration. In order to avoid this, it will be necessary to isolate the individual azobenzene groups or dilute them with some other inert molecular structures. From this point of view, azobenzene compounds covered with the ultrathin film forbid mutual stacking of the azobenzene groups, to thereby successfully avoid the suppression of the isomerization due to the association. Using the nano-wrapped molecular materials containing such azobenzene are also expectative in that providing molecule-sized memory devices and their integration.

As for conductive molecular wire, necessary conditions relate to that linear conductive molecular units are independent from each other, and that one-dimensional electric conduction can be observed. While conductive polymers have widely been known, they cannot directly be available as the molecular wire since difficulty is in isolating polymer chains. The nano-wrapped molecular materials are most advantageous to solve this problem, since the materials derived from conductive polymers having active hydroxyl groups or cationic charges can be obtained in a form of molecular Cable. Another possibility arises from coverage of the polymer materials with oxide ultrathin film, which enables conversion of combustible polymers to noncombustible polymers, and the use of such materials as precursor further enables to produce various network materials.

Applying the nano-wrapped molecular materials to the production of composite materials will break a way to mass production of various materials in which molecules are dispersed completely. Applying the active nano-wrapped molecular materials to the surface sol-gel process will allow production of nano-hybrid thin film materials. Nano-hybrid materials derived from a rigid polymer will result in materials of extremely precise in composition and more strong as compared with those of macro composites such as fiber, reinforced plastics, or reinforced concrete. Similarly, materials derived from heat-resistant polymers will result in nano-hybrid materials durable in use under high temperature.

Removing organic molecules with the aid of heat or oxygen plasma or so from the materials covered with an oxide ultrathin film can provide thin films or shells having molecule-sized pores, which will be available for separation or selective adsorption of molecules, or as a support.

On the other hand, the nano-wrapped molecular materials derived from compounds or nanoparticles having active hydroxyl groups in specific area thereof will have partial wrapping only in the area close to such functional groups. Such partial wrapping is available as a technique for aligning molecules on the surface of a substrate or particle in a specific orientation, or as a technique to adsorb the molecules onto a specific area of electrodes. Removal of the molecule used as a template can produce a oxide shell with an opening. In one advanced implementation of such method, an oxide shell is formed around an organic molecule having preliminarily protected terminal thiol group, and the protection of such thiol group is then removed, which process successfully produces a molecular package having the thiol group exposed thereon.

Producing glassy materials using nano-coated dye molecules or aggregates of dye molecules will result in materials in which the dye molecules or the aggregates are thoroughly dispersed in the glassy matrix.

Other possible applications of the molecular materials include nano-filter, nano-adsorbent, nano-column, DDS supports imprinted film having a large mechanical strength, and molecular switch, which can provide a valuable methodology for functional stabilization or integration for molecular units or biological molecules (DNA, protein, etc.) The present invention has a strong potential to convert characteristics of known molecules or nanoparticles into absolutely new ones, and accomplishment of the present invention will extend vast influence on every industrial fields in the 21st century.

Features of the present invention will be explained below in more detail referring to specific Examples. It is to be noted that materials, the amount, the ratio, detail of processing, and process procedures can properly be modified without oversteping the concept of the present invention. Therefore the scope of the present invention should not limitedly be understood based on specific examples described below.

EXAMPLE 1

Fluorescent intensity of fluorescein was first measured in order to prove that a molecule can actually be wrapped by a thin oxide film according to the present invention Fluorescein in an amount of 8.31 mg was dissolved into 50 ml of isopropanol, 2 ml of the solution was added with 10 ml of isopropanol solution of titanium isopropoxide ($5 \times 10^{-2}$ M), and the solution was further added with 8 ml of isopropanol and stirred at room temperature for 1 hour, to thereby obtain solution A. A reference solution was prepared by dissolving 8.31 mg of fluorescein into 50 ml of isopropanol, and diluting 2 ml of the resultant solution with 18 ml of isopropanol (solution B) Fluorescent spectra of these solutions were measured at an excitation wavelength of 450 nm. As shown in FIG. 1, with excitation at 450 nm, a maximum fluorescent wavelength (515 nm) of fluorescein (solution A) was found to deshifted by approx. 25 nm towards the longer wavelength region by the addition of titanium isopropoxide (solution B). The intensity was increased by approx. 25%. These indicate that the carboxyl group of fluorescein and titanium isopropoxide are complexed.

Next, 83.1 mg of fluorescein was dissolved into 50 ml of isopropanol, and 1 ml of the solution was added with 2.5 ml of isopropanol solution of titanium isopropoxide ($1 \times 10^{-1}$ M), 1 ml of isopropanol containing water at 1 M concentration, 2.5 ml of isopropanol solution of hexyltrimethoxysilane ($1 \times 10^{-1}$ M) and 3 ml of isopropanol, and the mixture was stirred at room temperature for two days, to thereby obtain solution C. A reference solution was prepared by dissolving 83.1 mg of fluorescein into 50 ml of isopropanol, adding to 1 ml of the solution 2.5 ml of isopropanol solution of titanium isopropoxide ($1 \times 10^{-1}$ M), 250 $\mu$l of isopropanol containing water at 1 M concentration and 6.25 ml of isopropanol, and stirring the mixture at room temperature for two days (solution D). Another reference solution was prepared by dissolving 83.1 mg of fluorescein into 50 ml of isopropanol, and diluting 1 ml of the solution with 9 ml of isopropanol (solution E). These solutions C to E were diluted with isopropanol to obtain solutions having fluorescein concentrations of $5 \times 10^{-4}$ M, $1 \times 10^{-4}$ M, $2 \times 10^{-5}$ M and $4 \times 10^{-6}$ M, respectively, and subjected to measurement of fluorescent spectra at an excitation wavelength of 450 nm.

Fluorescent intensities at 570 nm of the individual solutions were listed in Table 1.

TABLE 1

| | Fluorescent intensity | | |
|---|---|---|---|
| Fluorescein concentration | Fluorescein solution in isopropanol (solution E) | After added with titanium alkoxide (solution D) | After added with hexyltrimethoxysilane (solution C) |
| $4 \times 10^{-6}$M | 13.5 | 9.48 | 3.44 |
| $2 \times 10^{-5}$M | 44.2 | 25.3 | 4.24 |
| $1 \times 10^{-4}$M | 80.7 | 41.0 | 21.9 |
| $5 \times 10^{-4}$M | 107 | 37.2 | 51.9 |

Figure 2:
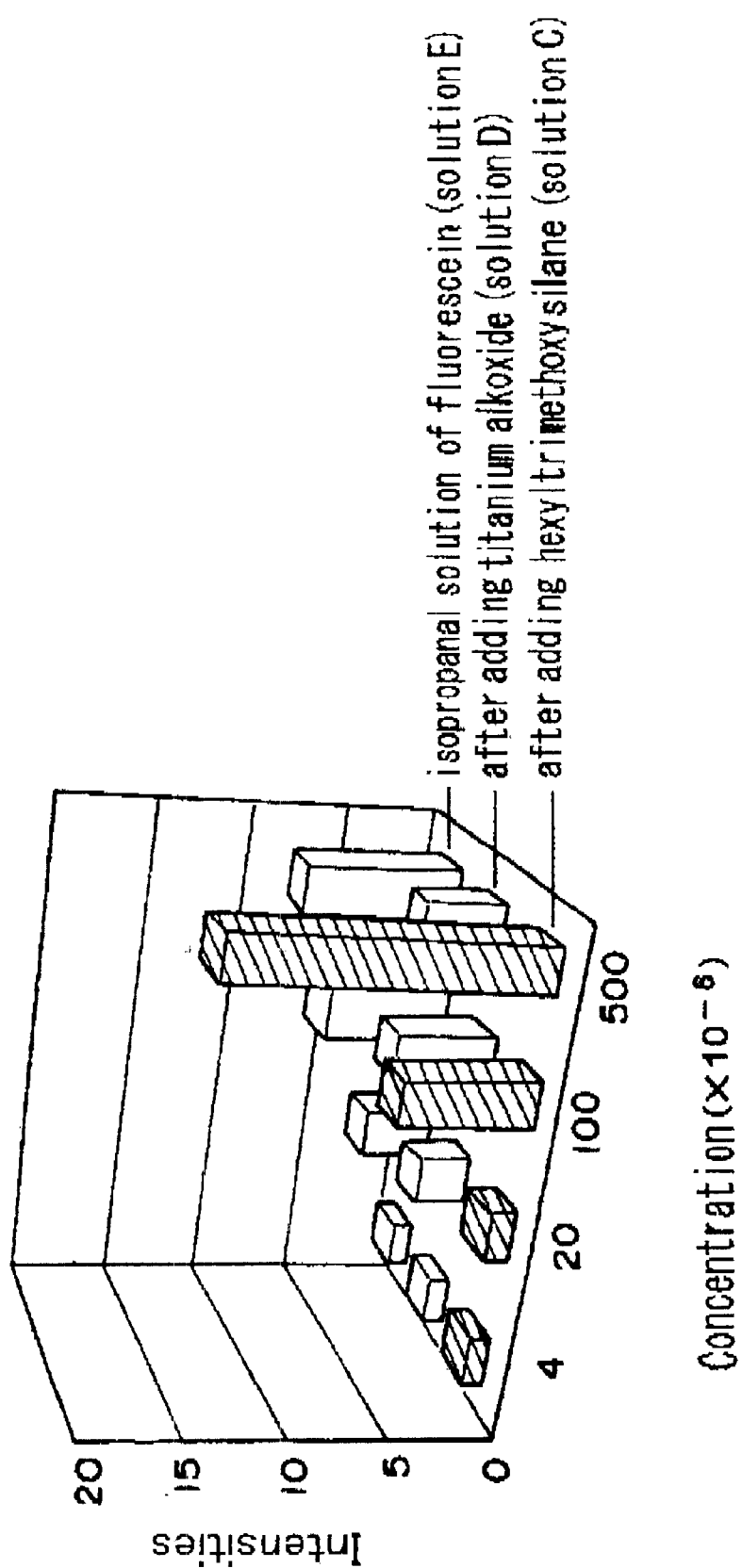
FIG. 2 is a graph showing concentration dependence of the fluorescent intensity for solutions of fluorescein alone in Example 1, the solutions added with titanium isopropoxide, and solutions added with titanium isopropoxide and hexyltrimethoxysilane.

It was clear from Table 1 that the fluorescent intensity of the isopropanol solution containing fluorescein increased monotonously as the fluorescein concentration increases, but addition of titanium isopropoxide reduced the fluorescent intensity at a concentration of $5 \times 10^{-4}$ M. This is attributable to an aggregation tendency in a high concentration range of fluorescein molecules formed a complex with titanium isopropoxide, which is causative of self-quenching. On the other hand, addition of hexyltrimethoxysilane reduced the fluorescent intensity in the lower concentration range as compared with a sample added with titanium isopropoxide, but conversely increased it in the higher concentration range. This is because hexyltrimethoxysilane suppressed intermolecular quenching of fluorescein in the higher concentration range. FIG. 2 is a graphical presentation of the fluorescent intensities at the individual concentrations listed in Table 1 after being normalized by the fluorescent intensity at $4 \times 10^{-6}$ M. As is known from FIG. 2, the addition of hexyltrimethoxysilane was proved to desirably suppress the quenching in the fluorescent spectra in the higher concentration range.

Figure 3:
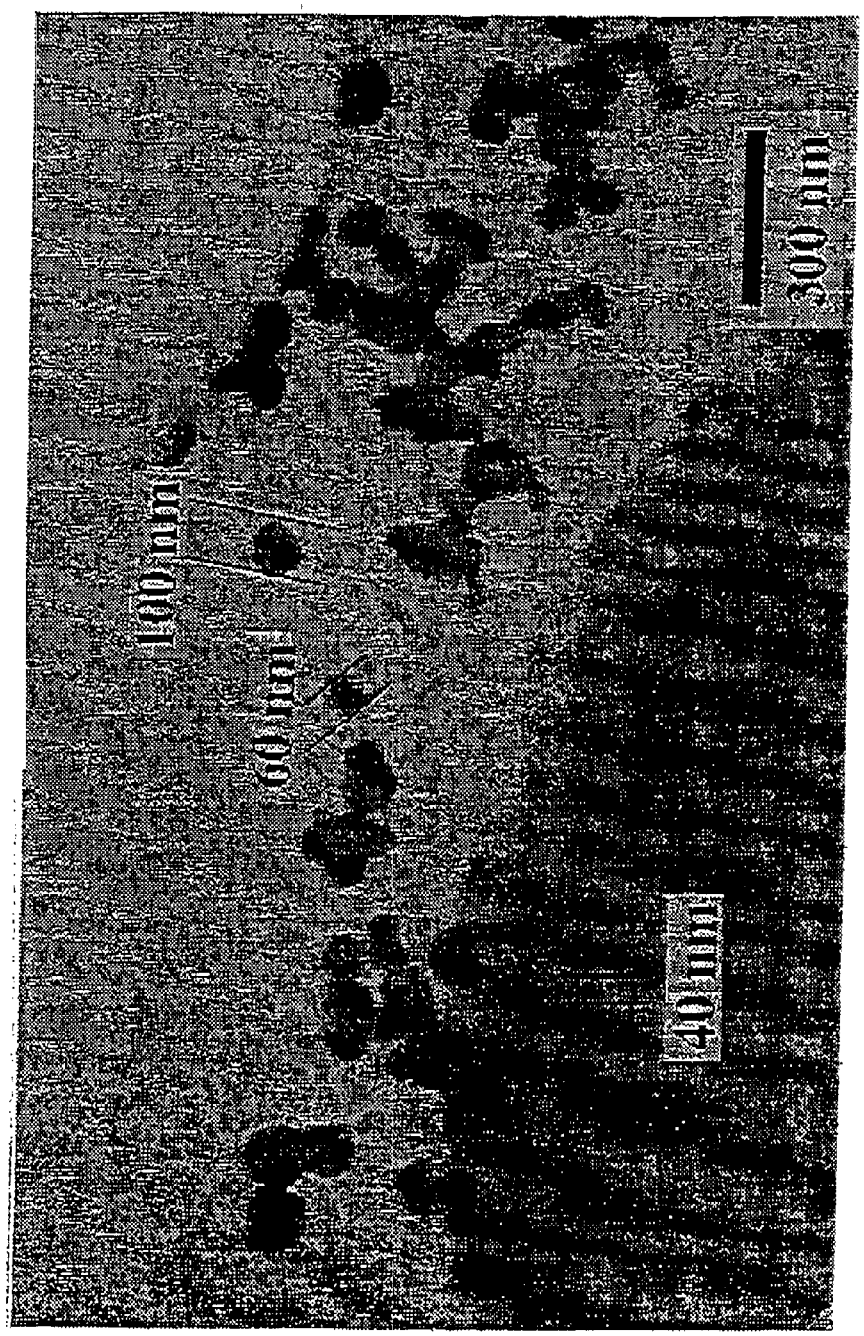
FIG. 3 is an electron microscopic image of titanium oxide nanoparticles coated with hexyltrimethoxysilane in Example 1.

Next, 8.31 mg of fluorescein was dissolved into 50 ml of isopropanol, and 500 $\mu$l of the solution was added with 500 $\mu$l of isopropanol solution of titanium isopropoxide ($25 \times 10^{-3}$ M), 25 $\mu$l of isopropanol containing water at 1 M concentration and 12.5 $\mu$l of isopropanol solution of hexyltrimethoxysilane solution (1 M), and the resultant mixture was stirred at room temperature for one day. The obtained solution was spread over a carbon-coated copper mesh, and observed with a transmission electron microscope. An observed microscopic image was shown in FIG. 3. FIG. 3 clearly shows that the solution having the above composition contains nanoparticles with diameter ranging from 40 to 100 nm or around. Examples 2 and 3 described next will prove that the particles are titania nanoparticles coated with hexyltrimethoxysilane and have fluorescein dyes enclosed therein.

EXAMPLE 2

Forty milliliters of isopropanol containing fluorescein ($2.5 \times 10^{-4}$ M) and titanium isopropoxide ($1.25 \times 10^{-2}$ M) was added with 1 ml of isopropanol containing water at 1 M concentration. Four milliliters each of the obtained solution was further added with 50 $\mu$l each of isopropanol solution of octyltrichlorosilane (1 M), isopropanol solution of hexyltrimethoxysilane (1 M) and isopropanol solution of tert-butylphosphoric acid (1 M) respectively, to thereby prepare three solutions, which were then allowed to stand at room temperature for one day.

Reference solutions prepared were isopropanol solution of fluorescein($2.5 \times 10^{-4}$ M), isopropanol solution containing fluorescein($2.5 \times 10^{-4}$ M) and titanium isopropoxide($1.25 \times 10^{-2}$ M), and isopropanol solution containing fluorescein ($2.5 \times 10^{-4}$ M) and titanium isopropoxide ($1.25 \times 10^{-2}$ M) added with 1 ml of isopropanol containing water at 1 M concentration.

Two milliliters each of the foregoing six solutions was added with isopropanol to thereby respectively prepare a five-fold diluted solution. Another 2 ml each of the foregoing six solution was also added with isopropanol to thereby respectively prepare a five-fold diluted solutions, and each of thus, solution was further added with 10 μl of isopropanol with of iodine ($I_2$) ($5 \times 10^{-2}$ M).

Fluorescent spectra of above 12 solutions were measured at an excitation wavelength of 450 nm. Fluorescent intensities at 560 nm were listed in Table 2. Ratios (%) of fluorescent intensities before and after adding $I_2$ were illustrated in FIG. 4.

TABLE 2

| Sample No. | Composition | Fluorescent Intensity Before adding $I_2$ | Fluorescent Intensity After adding $I_2$ | Ratio of fluorescent intensities before and after adding $I_2$ |
|---|---|---|---|---|
| 1 | Fluorescein only | 227.5 | 99.25 | 30.6% |
| 2 | Fluorescein + titanium propoxide (1:50) | 360.3 | 129.1 | 35.8% |
| 3 | Fluorescein + titanium propoxide + water (1:50:100) | 267.4 | 115.6 | 43.2% |
| 4 | Fluorescein + titanium propoxide + water + octyltrichlorosilane (1:50:100:50) | 133.6 | 136.4 | 102.1% |
| 5 | Fluorescein + titanium propoxide + water + hexyltrimethoxysilane (1:50:100:50) | 91.78 | 73.30 | 79.9% |
| 6 | Fluorescein + titanium propoxide + water + tert-butylphospheric acid (1:50:100:50) | 53.15 | 51.39 | 96.7% |

Figure 4:
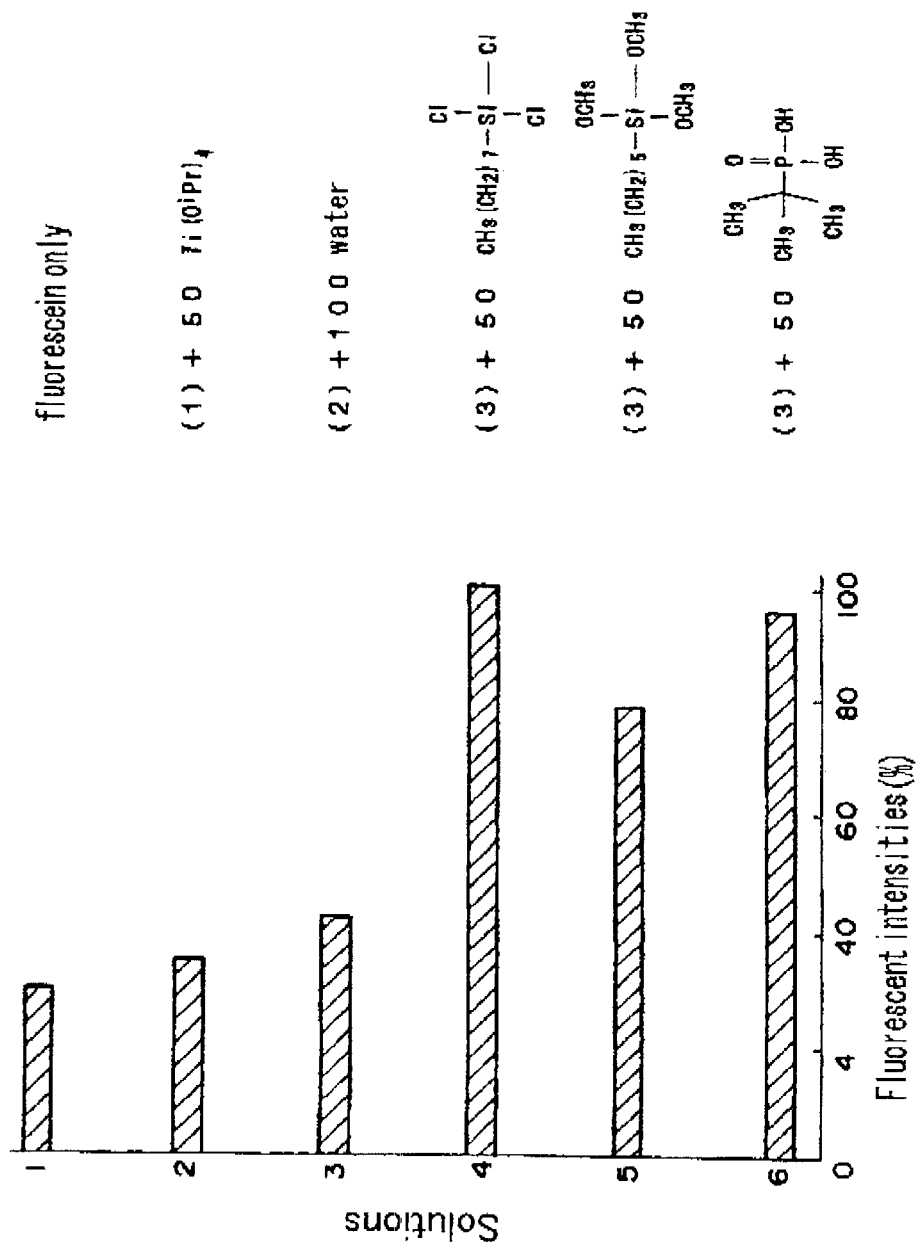
FIG. 4 is a graph showing decrease in fluorescent intensity caused by iodine addition to the individual solutions in Example 2.

As illustrated in FIG. 4 fluorescent intensity of the solution containing simply fluoresce decreased to approx. 30% by the iodine addition. This is because iodine acts as a quencher. Almost same quenching efficiency due to iodine was observed for the solution additionally containing titanium propoxide, where the fluorescent intensity decreased as low as 35% or around. Approximately 57% of fluorescent intensity was lost by the iodine addition for the fluorescein solution added with titanium propoxide and further with water. On the contrary, 80% or more fluorescent intensity was maintained even after the iodine addition for the solutions respectively added with octyltrichlorosilane, hexyltrimethoxysilane and tert-butylphosphoric acid. This indicates that the addition of such capping agents successfully shielded the titania-coated fluorescein from iodine.

EXAMPLE 3

Forty-two milligrams of fluorescein was dissolved into 25 ml of isopropanol, and 1 ml of the solution was added with 2 ml of isopropanol solution of titanium isopropoxide (100 mM), and 400 μl of isopropanol containing water at 1 M concentration. Such solution was provided in a pair, where one was further added with 2.5 ml of isopropanol solution of aminopropyltrimethoxysilane (100 mM), the other was added with 2.5 ml of isopropanol solution of (6-aminohexyl) aminopropyltrimethoxysilane (100 mM), and the both solutions were further diluted by adding 19 ml of isopropanol, respectively. The solutions were stirred at room temperature for two days, added with 100 μl of concentrated hydrochloric acid, allowed to stand for several days, and the generated precipitate was collected by centrifugation at 5,000 rpm for 20 minutes and then dried in the air. The precipitate was found to be titanium particles capped on the surface thereof with the aminoalkylsilane compounds, and showed an excellent dispersibility in water.

Figure 5:
FIG. 5 is an electron microscopic image of titanium oxide nanoparticles coated with (6-aminohexyl) aminopropyltrimethoxysilane in Example 3.

The particle capped with (6-aminohexyl) aminopropyltrimethoxysilane was observed with a transmission electron microscope. An observed microscopic image was shown in FIG. 5. FIG. 5 clearly shows that the particles have a diameter of 150 to 300 nm and have the surface coated with a thin film. The excellent water solubility thereof indicates that the particle surface is covered with amino group. Such technique ensures dispersion in water of fluorescein which could have essentially been dispersed in water only at a low concentration. In this Example, it was confirmed from UV spectrometry that 5 to 50% of fluorescein employed was dispersible in water.

EXAMPLE 4

Figure 6:
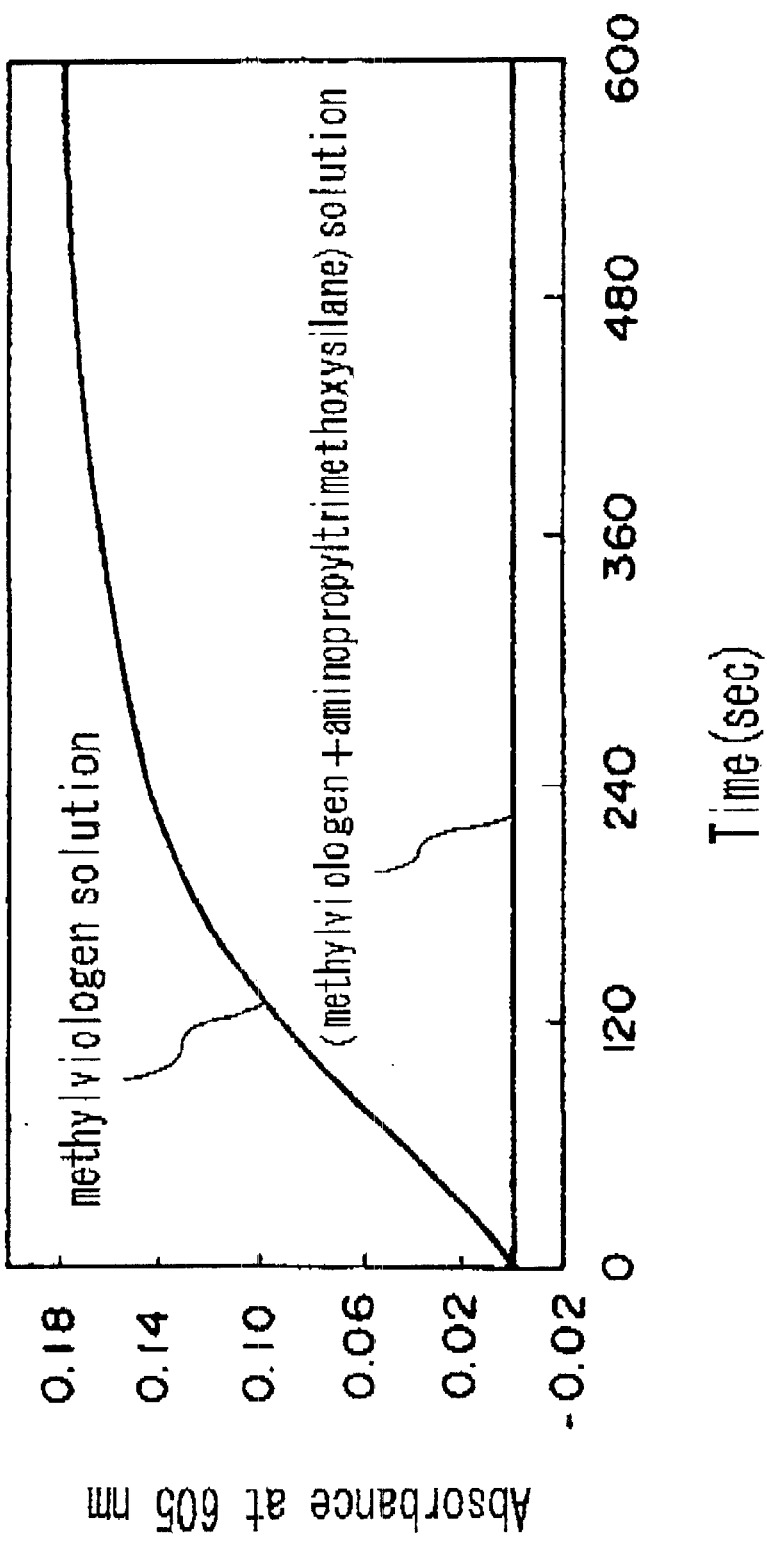
FIG. 6 shows absorbance changes in visible light absorption spectra at 605 nm caused by hydrazine reduction in Example 4.

One milliliter of methanol solution of methylviologen dichloride (100 mM) was added with 1 ml of water and 22 ml of methanol, further added with 0.896 g of aminopropyltrimethoxysilane, and allowed to stand for one week. The obtained solution was diluted ten times with ethanol. An ethanol solution of methylviologen dichlioride (0.4 mM) was separately prepared as a reference solution. Four hundred microliters each of these solutions was respectively poured into an UV cell, replaced with nitrogen, and added with 100 μl of an ethanol solution of hydrazine (10 M) The ethanol solution of methylviolgen dichloride (0.4 mM), used as a reference solution, turned into blue with time, which proved formation of a one-electron reduced product. Absorbace at 605 nm, which typifies a characteristic absorption of such product, was found to gradually increase over 10 minutes. The result was shown in FIG. 6. On the other hand, the solution added with aminopropyltrimethoxysilane did not show any sign of formation of one-electron reduced product of methylviologen. This indicates that a shell was formed around a methyviologen molecule by hydrolysis of aminotrimethoxysilane, which shielded the viologen from being reduced by hydrazine.

Figure 7:
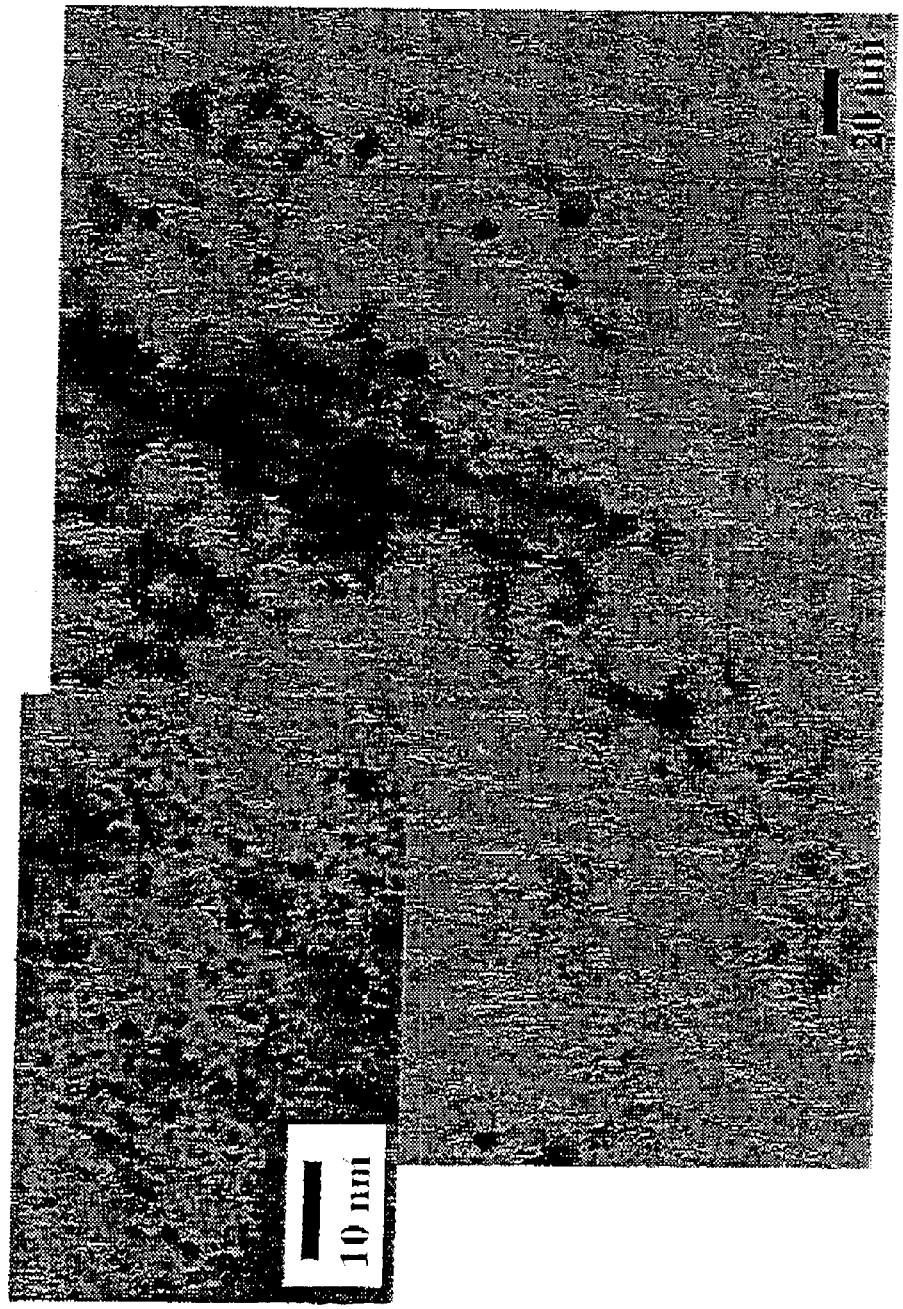
FIG. 7 is an electron microscopic image of viologen molecule coated with aminopropyltrimethoxysilane in Example 4.

Next, 1 ml of an aqueous solution of methylviologen dichloride (100 mM) and 8.1 ml of water were mixed, the mixture was added with 0.896 g of aminopropyltrimethoxysilane and heated at 50° C. for one hour, and the mixture was further added with 1 ml of concentrated hydrochloric acid and heated at 50° C. for six hours. The obtained solution was spread over a carbon-coated copper mesh, stained with sodium hexachloro-platiate, and observedwith a transmission electron microscope. An observed microscopic image was shown in FIG. 7. FIG. 7 clearly shows that the solution having the above composition contains nanoparticles with diameter ranging from 2 to 3 nm or around. The observed particle was found to have a size equivalent to that of a nanoparticle obtained by coating a methylviologen molecule with the shell produced by hydrolysis of aminopropyltrimethoxysilane.

Figure 8:
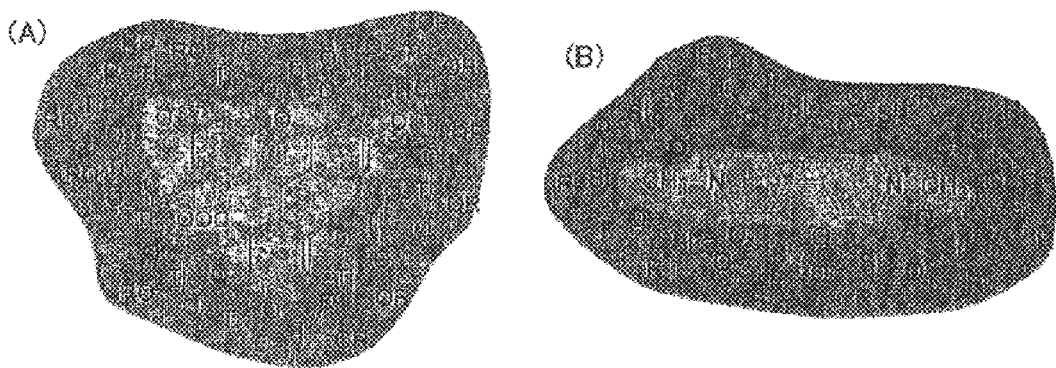
FIGS. 8A and 8B are schematic illustrations of the nano-wrapped molecular materials in Examples 1 and 4.

Schematic presentations of the structures of the nano-wrapped molecular materials in Examples 1 and 4 were shown in FIGS. 8A and 8B.

EXAMPLE 5

To prove that polymers can be wrapped by metal oxide film according to the present invention, polybutanylviologen dibromide (approximately as large as 25-mer) coated with a silicate thin film was observed with an electron microscope.

Figure 9:
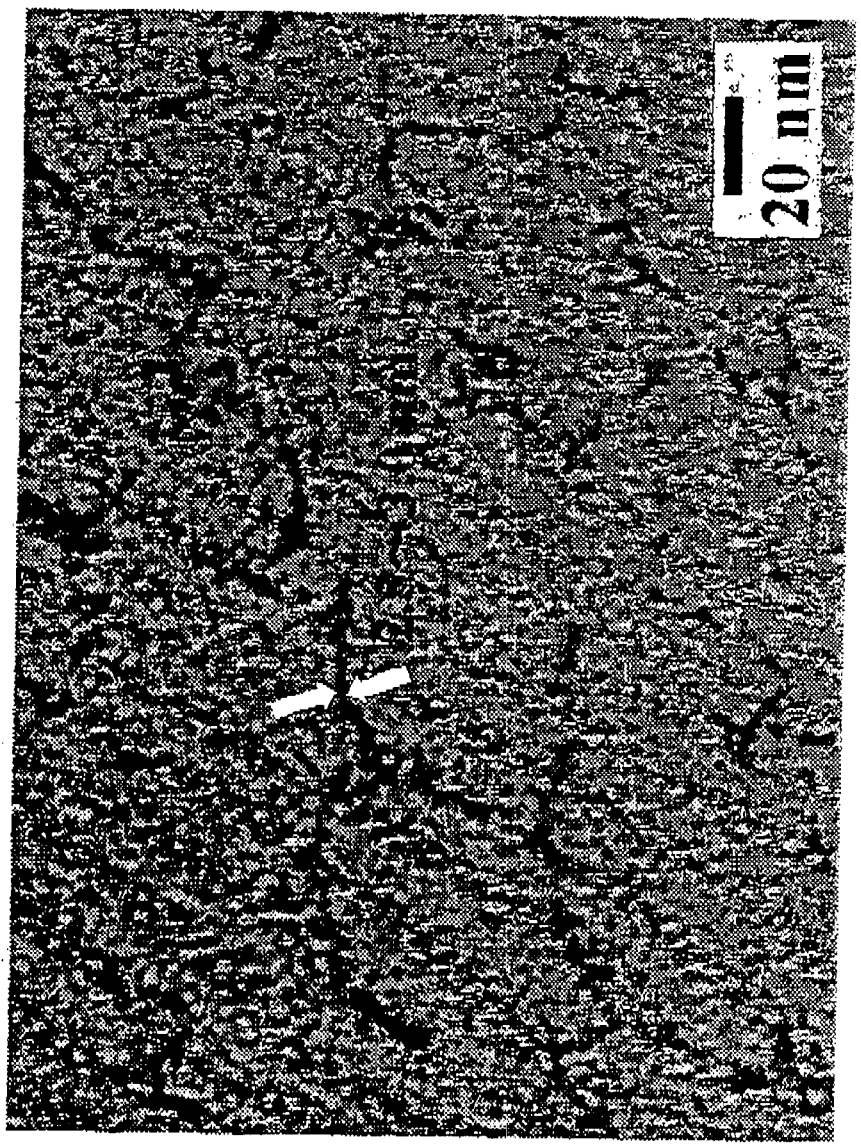
FIG. 9 is an electron microscopic image of polybutanyl-viologen dibromide coated with a thin silicate film in Example 5.

Ion-exchanged water in an amount of 2.5 ml was added with 400 μl of 100 mM aqueous sodium silicate ($Na_2SiO_3$) solution, further added with 20 μl of an 1 N aqueous sodium hydroxide solution, and the mixture was then stirred at 25° C. for 15 minutes. A separate solution was prepared by mixing 2 ml of ion-exchanged water with 10 μl of 100 mM (on the monomer basis) aqueous polybutanylviologen dibromide solution, the resultant solution was added to the foregoing mixed solution containing sodium silicate and sodium hydroxide, and the mixture was stirred at room temperature for three hours. The mixed solution was allowed to stand at room temperature for two weeks, diluted five times with ion-exchanged water, spread over a carbon-coated copper mesh, stained with a 20 mM gadolinium nitrate solution, and then observed with a transmission electron microscope. An observed microscopic image was shown in FIG. 9. FIG. 9 clearly shows a string-like structure of 2.5 to 3.0 nm wide and 10 to 80 nm long. This result indicates that a thin silicate film of approx. 1 nm thick was formed surrounding a single polymer chain of polybutanylviologen dibromide. It was thus confirmed that the individual polymer chains can be wrapped with a silicate nano-layer.

EXAMPLE 6

A coating with 5,10,15,20-tetrakis-(N-methylpyridinium-4-yl)-21H,23H-morphine-tetrakis(p-toluenesulfonate) referred to as "TMPyP", hereinafter) was examined.

An 1 mM aqueous TMPyP solution, a 100 mM aqueous sodium silicate ($Na_2SiO_3$) solution, and a 100 mM aqueous N-(triethoxy-silylpropyl)-O-polyethyleneoxide urethane solution were prepared.

Sample A was then prepared by mixing 5 ml of the 1 mM aqueous TMPyP solution and 6 ml of the 100 nM aqueous sodium silicate ($Na_2SiO_3$) solution, stirring the resultant mixture for 10 minutes, adding 5 ml of the 100 mM aqueous N-(triethoxy-silylpropyl)-O-polyethyleneoxide urethane solution, adding 100 μl of an 1 N aqueous hydrochloric acid solution, stirring the resultant mixture for 12 hours, further adding 500 μl of an 1 N aqueous hydrochloric acid solution, and stirring the resultant mixture at 50° C. for 6 hours The obtained solution was confirmed to be adjusted at pH 8.5.

Sample B was prepared by mixing 5 ml of the 1 mM aqueous TMPyP solution and 5 ml of the 100 mM aqueous sodium silicate ($Na_2SiO_3$) solution, stirring the resultant mixture for 10 minutes, adding 5 ml of the 100 mM aqueous N-(triethoxysilyl-propyl)-O-polyethyleneoxide urethane solution, adding 100 μl of an 1 N aqueous hydrochloric acid solution, stirring the resultant mixture for 10 minutes, further adding 300 μl of an 1 N aqueous hydrochloric acid solution, stirring the resultant mixture for 10 minutes, and still further adding 200 μl of an 1 N aqueous hydrochloric acid solution. The obtained solution was confirmed to be adjusted at pH 8.0.

Sample C was prepared by mixing 5 ml of the 1 mM aqueous TMPyP solution and 3 ml of the 100 mM aqueous sodium silicate ($Na_2SiO_3$) solution, stirring the resultant mixture for 10 minutes, adding 3 ml of the 100 mM aqueous N-(triethoxysilylproply)-O-polyethyleneoxide urethane solution, adding 100 μl of an 1 N aqueous hydrochloric acid solution, stirring the resultant mixture for 10 minutes, further adding 100 μl of an 1 N aqueous hydrochloric acid solution, stirring the resultant mixture for 10 minutes, and still further adding 200 μl of an 1 N aqueous hydrochloric acid solution. The obtained solution was confirmed to be adjusted at pH 4.0.

Sample D was prepared by mixing 5 ml of the 1 mM aqueous TMPyP solution and 500 μl of the 100 mM aqueous sodium silicate ($Na_2SiO_3$) solution and 4.5 ml of ion-exchanged water, stirring the resultant mixture for 10 minutes, adding 5 ml of the 100 mM aqueous N-(triethoxysilylpropyl)-O-polyethyleneoxide urethane solution, adding 50 μl of an 1 N aqueous hydrochloric acid solution, and stirring the resultant mixture for 10 minutes. The obtained solution was confirmed to be adjusted at pH 6.0.

Thus prepared solutions of samples A to D were individually filtered through a membrane filter with a pore size of 0.45 μm, 8 ml each of the solutions was enclosed in a membrane tube having a divisional molecular weight of 3,500, and allowed to dialyze against 350 ml of ion-exchanged water for a day. Based on the post-dialytic volume of the solution within the membrane tube and the concentration estimated from UV/visible absorption spectrum, a post-dialytic residual ratio of TMPyP was calculated. Results were listed in Table 3. As is clear from Table 3, residual ratio of PMPyP depends on the mixing ratio of TMPyP and sodium silicate. Under the condition of this Example, a highest residual ratio was shown by sample A which contains sodium silicate in 120 equivalents of TMPyP. These results indicate that TMPyP was enclosed in a nanoparticle formed by sodium silicate. Such nanoparticle will never precipitate in a neutral or acidic aqueous solution because of the coating of N-(triethoxysilylpropyl)-O-polyethyleneoxide urethane.

TABLE 3

| | Residual ratio (%) of TMPyP |
|---|---|
| Sample A | 62 |
| Sample B | 37 |
| Sample C | 7.5 |
| Sample D | 0.8 |

EXAMPLE 7

To prove that the obtained nanoparticle was composed of TMPyP and sodium silicate surrounding thereof, the nanoparticle was observed with an electron microscope.

Figure 10:
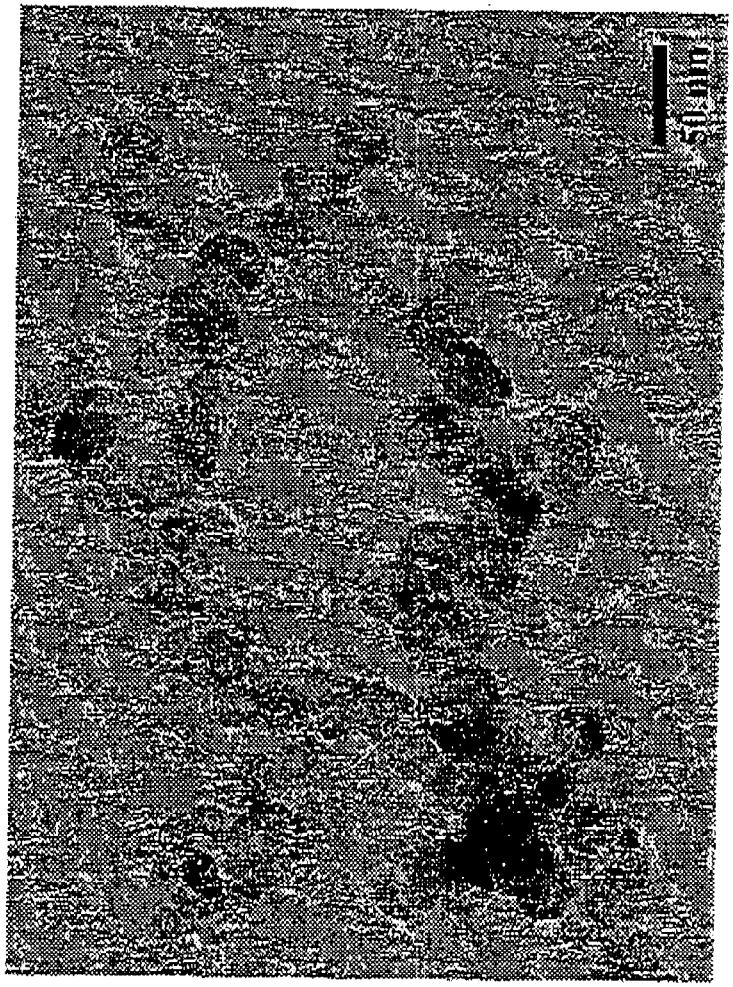
FIG. 10 is an electron microscopic image of nanoparticles consisting of aggregates of TMPyP coated with a thin silicate film in Example 7.

Ion-exchanged water in an amount of 20 ml was added with 400 μl of an 1 mM aqueous TMPyP solution, and further added with 500 μl of a 100 mM aqueous sodium silicate ($Na_2SiO_3$) solution. The mixing ratio of TMPyP and $Na_2SiO_3$ herein equals to 1:125. The solution was heated at 80° C. for 12 hours, spread over a carbon-coated copper mesh, stained with sodium hexachloro-platiate, and observed under a transmission electron microscope An observed microscopic image was shown in FIG. 10. FIG. 10 clearly shows that the solution having the above composition contains nanoparticles with diameter of 25 mn or around. The particle was found to be a nanoparticle formed by aggregation of TMPyP coated with the thin silicate film.

EXAMPLE 8

To prove that proteins can be wrapped with thin metal oxide film, cytochrome c coated with thin silicate film was observed with an electron microscope.

Figure 11:
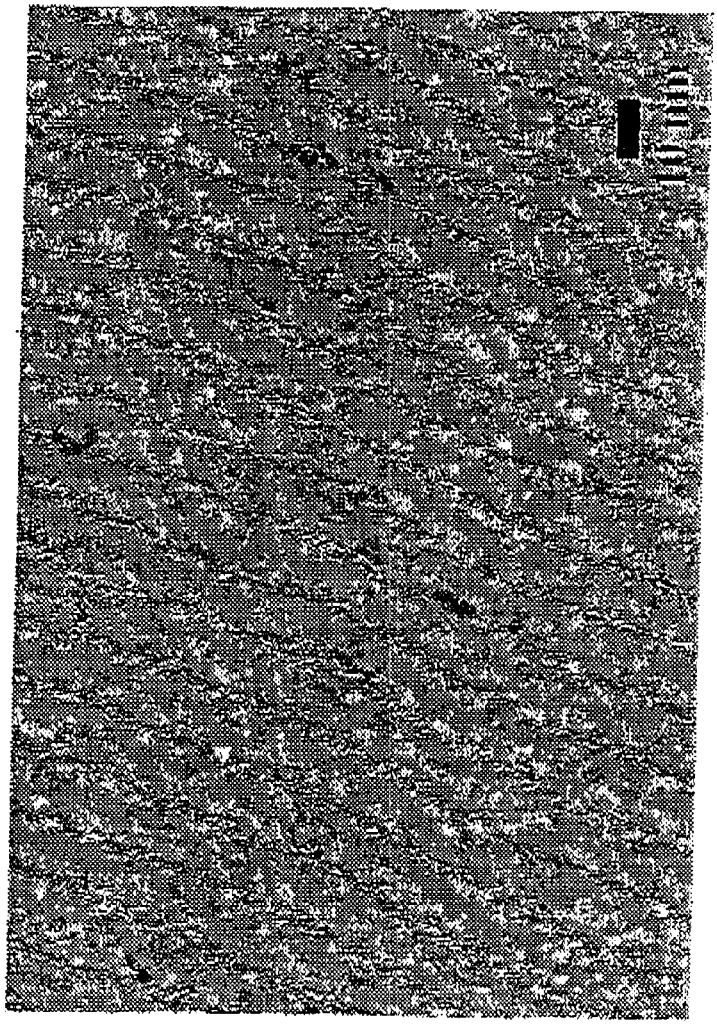
FIG. 11 is an electron microscopic image of cytochrome c coated with a thin silicate film in Example 8.

Ion-exchanged water in an amount of 8.7 ml was added with 200 μl of a 100 mM aqueous sodium silicate ($Na_2SiO_3$) solution, further added with 100 μl of a 0.1 N aqueous sodium hydroxide solution, and stirred at 25° C. for 15 minutes. One milliliter of a 0.1 N aqueous cytochrome c solution (on the basis of MW=13,000) was added to the resultant solution, stirred and then allowed to stand at room temperature for three days. The obtained solution was spread over a carbon-coated copper mesh, stained with a 20 mM aqueous gadolinium solution, and observed a transmission electron microscope. An observed microscopic image was shown in FIG. 11. FIG. 11 clearly shows a lot of hollow structures having an inner diameter of 2 to 3 nm and outer diameter of 7 to 8 nm. The inner diameter of such hollow structure was found to agree with the diameter of cytochrome c (2 to 3 nm). The electron microscopic observation thus indicates that a cytochrome c molecule is coated with a thin silicate film of approx. 2 nm thick. This means that the individual protein molecules can be wrapped with a silicate nanolayer.

EXAMPLE 9

To prove that the linear biological polymers can be wrapped with thin metal oxide film, dextran coated with a thin silicate film was observed an electron microscope.

Figure 12:
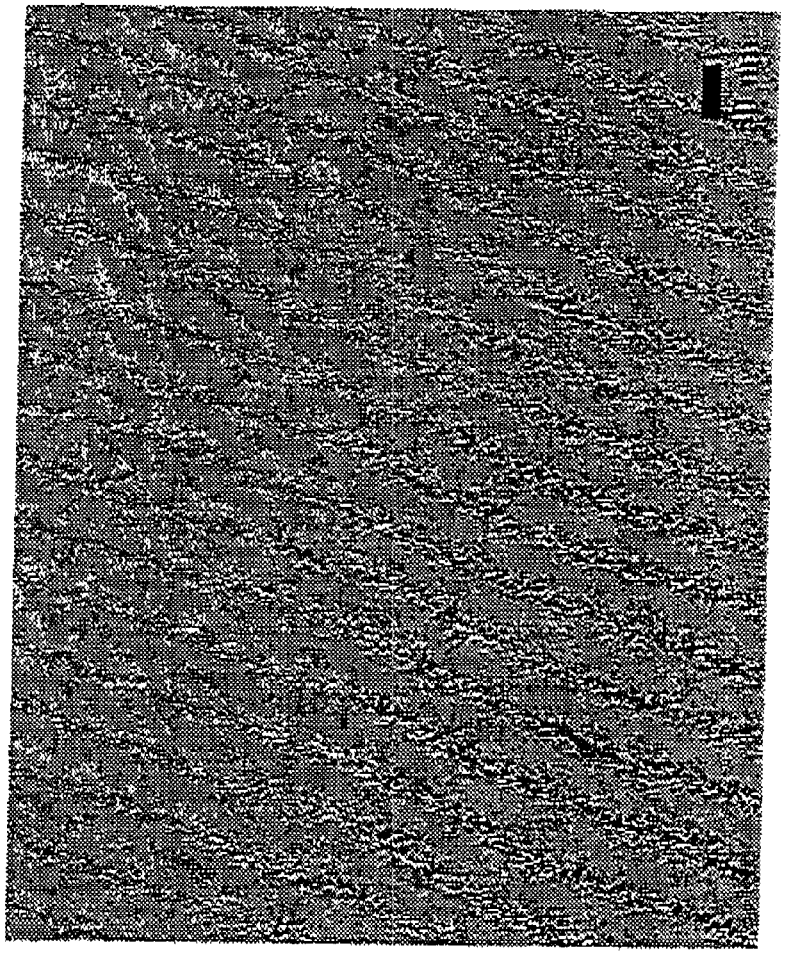
FIG. 12 is an electron microscopic image of dextran coated with a thin silicate film in Example 9.

Ion-exchanged water in an amount of 4.7 ml was added with 80 μl of 100 mM aqueous sodium silicate ($Na_2SiO_3$) solution, further added with 200 μl of 1 mM aqueous dextran solution (average molecular weight=66,700, concentration is on the basis of glucose unit), the resultant solution was stirred, further added with 40 μl of a 100 mM aqueous barium nitrate solution and 40 μl of a 100 mM aqueous cesium nitrate solution, and allowed to stand at room temperature for 12 hours. The obtained solution was spread over a carbon-coated copper mesh, and observed with a transmission electron microscope without staining. An observed microscopic image was shown in FIG. 12. FIG. 12 clearly shows a string-like structure of approx. 4 nm wide. This result indicates that a thin silicate film of approx 1.5 nm thick was formed surrounding dextran. It was thus confirmed that the individual dextran chains can be nano-wrapped with silicate. Similar observation using dextran with a molecular weight of 10,000 revealed a smaller string-like structure.

The present invention is to provide novel nano-wrapped molecular structures having one or more molecules, molecular aggregates, or nanoparticles as a core, and an ultrathin film as a shell. The conventional technique was successful in retaining properties of the individual molecules only when they were dispersed in a dilute solution, on a two-dimensional surface, or in a three-dimensional matrix at a molecular level. On the contrary, properties of the individual molecules in the present invention will not be lost even in a concentrated solution or in a solid state. The wrapping according to the present invention will provide independent structures having enclosed therein characteristics of the individual molecules, which is successful in avoiding changes in molecular characteristic due to inter-molecular interaction ascribable to aggregation or crystallization, and in liberating molecules from restriction of molecular conformation ascribable to the crystal structure thereof. In particular, the present invention can visualize the individual molecules, which will be advantageous for investigation of conformational characteristics of flexible polymer chain or the individual biological polymers such as proteins and saccharides. Such features of the present invention will provide a fundamental tool for producing excellent molecular materials, and should give rise to enormous applications in the fields of chemistry, engineering, and medical science.

What is claimed is:

1. A nano-wrapped molecular material comprising at least one selected from the group consisting of molecule, molecular aggregate, and nanoparticle wherein at least one of said molecule, said molecular aggregate, or said nanoparticle have a surface at least partially covered with an ultrathin film containing oxygen-metal bond.

2. A nano-wrapped molecular material comprising a plurality of molecules, molecular aggregates, and/or nanoparticles wherein said plurality of molecules, molecular aggregates, and/or nanoparticles are covered with a single continuous ultrathin film containing oxygen-metal bond.

3. The nano-wrapped molecular material as claimed in claim 2, wherein a plurality of molecules, molecular aggregates and/or nanoparticles are thoroughly dispersed in the single continuous ultrathin film.

4. The nano-wrapped molecular material as claimed in claim 1, wherein the molecule, molecular aggregate or nanoparticle is bound with the ultrathin film through at least one selected from the group consisting of chemical bond, physical bond, and electrostatic bond.

5. The nano-wrapped molecular material as claimed in claim 1, wherein the molecule, molecular aggregate, or nanoparticle is wrapped with two or more layers of the ultrathin film.

6. The nano-wrapped molecular material as claimed in claim 1, wherein the molecule, the molecular aggregate, and/or the nanoparticle are covered or wrapped with one or more layers of the ultrathin film having a total thickness of the wrapping film of 0.5 to 100 nm.

7. The nano-wrapped molecular material as claimed in claim 1, which has a reactive outer surface.

8. The nano-wrapped molecular material as claimed in claim 1, wherein the molecule, molecular aggregate, or nanoparticle is physically isolated from solvent molecule in a partial or extensive manner, and has solubility.

9. The nano-wrapped molecular material as claimed in claim 1, wherein the molecule, molecular aggregate, or nanoparticle is covered with the ultrathin film to an extent which does not cause substantial changes in the properties of the molecule, molecular aggregate or nanoparticle due to interaction between the molecules or nanoparticles.

10. The nano-wrapped molecular material as claimed in claim 1, wherein the coverage with the ultrathin film is attained by hydrolysis and condensation of metal alkoxide compound.

11. The nano-wrapped molecular material as claimed in claim 10, wherein the molecule, molecular aggregate, or nanoparticle has on the surface thereof active groups having reactivity with the metal alkoxide compound, and the ultrathin film is formed by allowing at least a part of the active groups to bind with the metal alkoxide compound, and then hydrolyzing the product to thereby condense the metal alkoxide compound.

12. The nano-wrapped molecular material as claimed in claim 10, wherein the molecule, molecular aggregate, or nanoparticle has on the surface thereof active groups having reactivity with the metal alkoxide compound, and the ultrathin film is formed by allowing at least a part of the active groups to bind with the metal alkoxide condensate formed by condensing a plurality of metal alkoxide molecules.

13. The nano-wrapped molecular material as claimed in claim 1, wherein the molecule, molecular aggregate, or nanoparticle has on the surface thereof cationic charges, and the ultrathin film is formed by allowing at least a part of the cationic charges to interact in an electrostatic manner with a condensate of silanol-group-containing compound.

14. The nano-wrapped molecular material as claimed in claim 1, wherein the molecule, molecular aggregate, or nanoparticle has on the surface thereof hydrogen-bond-formable groups, and the ultrathin film is formed by allowing at least a part of the hydrogen-bond-formable groups to interact through hydrogen bonding with a condensate of silanol-group-containing compound.